US011200435B1

(12) United States Patent
Scanlon et al.

(10) Patent No.: US 11,200,435 B1
(45) Date of Patent: Dec. 14, 2021

(54) PROPERTY VIDEO SURVEILLANCE FROM A VEHICLE

(71) Applicant: ObjectVideo Labs, LLC, Tysons, VA (US)

(72) Inventors: Andrew Scanlon, Falls Church, VA (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/815,769

(22) Filed: Mar. 11, 2020

Related U.S. Application Data

(60) Provisional application No. 62/816,607, filed on Mar. 11, 2019.

(51) Int. Cl.
| | |
|---|---|
| G06K 9/00 | (2006.01) |
| H04N 7/18 | (2006.01) |
| G05D 1/00 | (2006.01) |
| B60R 11/04 | (2006.01) |

(52) U.S. Cl.
CPC .......... *G06K 9/00812* (2013.01); *B60R 11/04* (2013.01); *G05D 1/0094* (2013.01); *H04N 7/185* (2013.01); *H04N 7/188* (2013.01)

(58) Field of Classification Search
CPC .... G06K 9/00812; H04N 7/188; H04N 7/185; B60R 11/04; G05D 1/0094
See application file for complete search history.

(56) References Cited

U.S. PATENT DOCUMENTS

| | | | |
|---|---|---|---|
| 8,184,161 B2 | 5/2012 | Trapani | |
| 2006/0066722 A1* | 3/2006 | Yin | ......................... G06T 7/254 348/143 |
| 2007/0027595 A1 | 2/2007 | Nou | |
| 2012/0056758 A1* | 3/2012 | Kuhlman | ................. G08G 1/14 340/932.2 |
| 2015/0356864 A1 | 12/2015 | Hutchings | |
| 2018/0218582 A1* | 8/2018 | Hodge | ............... H04N 21/4334 |
| 2019/0244301 A1* | 8/2019 | Seth | ....................... G06Q 40/08 |

\* cited by examiner

*Primary Examiner* — Nasim N Nirjhar
(74) *Attorney, Agent, or Firm* — Fish & Richardson P.C.

(57) ABSTRACT

Methods, systems, and apparatus, including computer programs encoded on a computer storage medium, for cooperative video surveillance. The methods, systems, and apparatus include actions of determining that a vehicle has arrived at a particular parking spot, determining a view of a property for an onboard camera for the vehicle, providing a detection rule to the vehicle based on the view of the property for the onboard camera for the vehicle, and receiving an image captured by the onboard camera for the vehicle based on satisfaction of the detection rule.

62 Claims, 5 Drawing Sheets

PROPERTY VIDEO SURVEILLANCE FROM A VEHICLE

CROSS-REFERENCE TO RELATED APPLICATIONS

This application claims the benefit of U.S. Provisional Application No. 62/816,607, filed Mar. 11, 2019, which is incorporated by reference in its entirety.

TECHNICAL FIELD

This disclosure application relates generally to video surveillance.

BACKGROUND

Many homes and business have street-facing cameras that look past the property line. Surveillance of a home by a surveillance device located at or near an edge of the property, e.g., from a street facing the front of the home, can be limited due to logistical difficulties of installing surveillance devices at or near the edge of the property. Views of the home from the perspective of the street can be useful for accessing fields of view of the driveway and front entrances.

SUMMARY

Techniques are described for cooperative video surveillance between a vehicle and a home. Vehicles are increasingly incorporating multiple cameras and sensors to provide backup, dashboard, blind spot, or 360° views to drivers or to enable driver-safety, driver-assistance, or autonomy features that can be engaged by a home monitoring system of a home to provide enhanced surveillance of the home.

More particularly, data collected from a vehicle, e.g., video data from an onboard camera, telemetry, and/or global positioning system (GPS) data for the vehicle, and data (e.g., video data, GeoFence data) from surveillance devices from a home monitoring system of a home can be utilized to determine a relative geographic location of the vehicle to the home and a respective field of view of each camera of one or more onboard cameras for the vehicle. The home monitoring system can provide to each onboard camera of the vehicle a set of rules dictating providing video data from the onboard camera to the home monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements.

DETAILED DESCRIPTION

Techniques are described for cooperative video surveillance between a vehicle parked nearby a home and the home, where the vehicle has outward facing onboard cameras or other surveillance devices and can be engaged by a home monitoring system of the home to provide enhanced surveillance of the home. A home monitoring system for the home can receive information about respective capabilities, e.g., fields of view, of each onboard camera of a vehicle that is parked nearby the home and leverage video data collected by the onboard cameras to provide enhanced surveillance of home, e.g., during a detection event. The home monitoring system can provide to each onboard camera of the vehicle a respective set of detection rules based in part, for example, on the particular capabilities of the onboard camera. Detection rules can dictate when and how the onboard camera collects and provides video data from the onboard camera to the home monitoring system.

Figure 1:
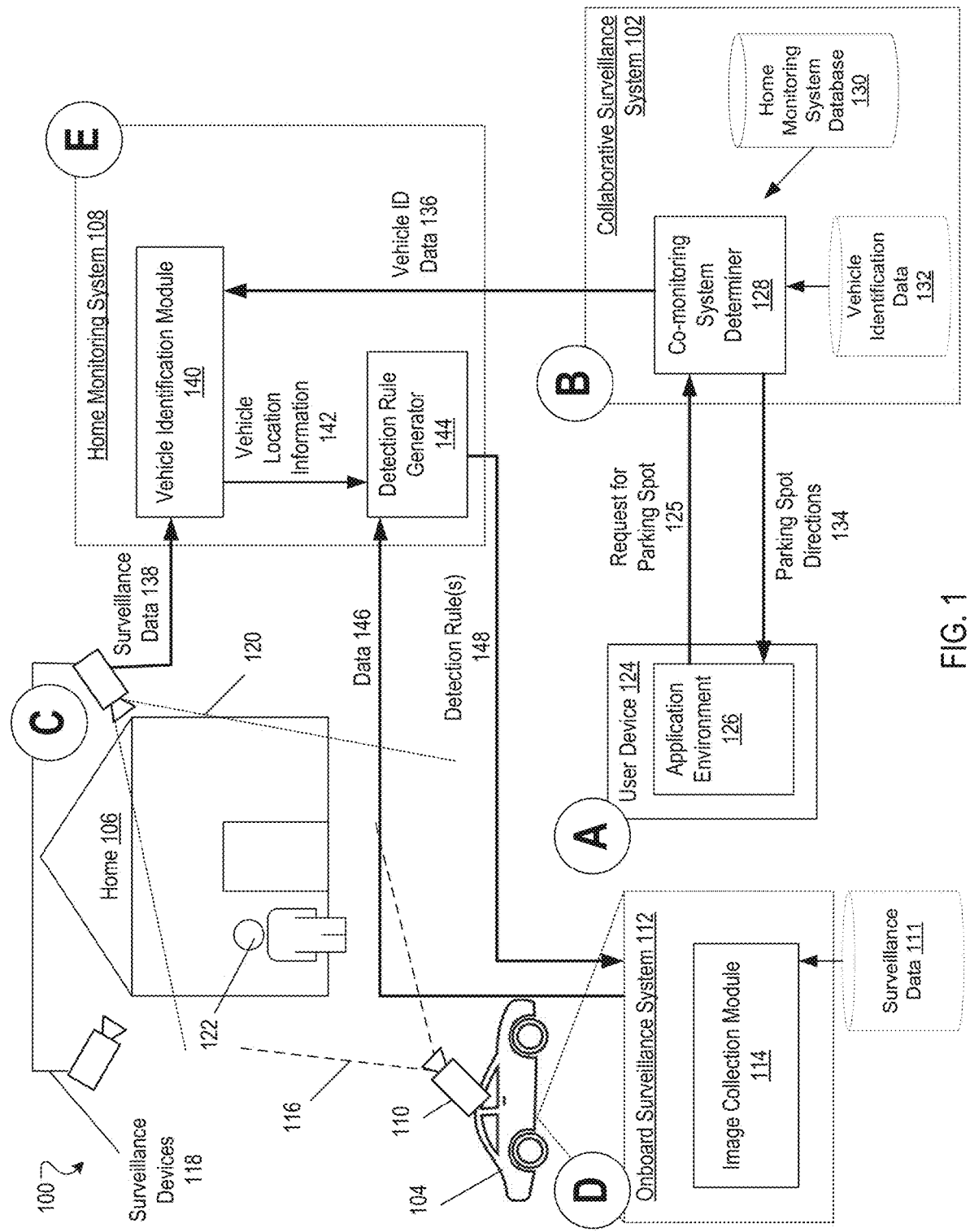
FIG. 1 illustrates an example operating environment for a collaborative surveillance system.

FIG. 1 illustrates an example operating environment 100 for a collaborative surveillance system 102. The collaborative surveillance system 102 can determine one or more eligible vehicles 104 that are in proximity to a home 106 including a home monitoring system 108. The vehicle 104 includes one or more onboard outward facing surveillance devices, for example, an onboard outward facing camera 110.

Vehicle 104 can be a commercial or non-commercial vehicle, for example, a car, a truck, a bus, a flatbed, a trailer truck, or another piece of heavy machinery (e.g., a forklift, tractor, and backhoe) that is operated on a roadway. For example, a vehicle 104 can be a car. In another example, a vehicle 104 can be a public transit vehicle (e.g., bus or train). Vehicle 104 can include an onboard control unit which can monitor and/or control various sensors (e.g., tire air pressure, engine temperature, throttle position, fuel levels, etc.), automatic transmission, anti-lock brakes, air bag deployment, keyless entry, climate control, motorized seats/mirrors, entertainment center (e.g., radio, compact disc player), cruise control, or the like. Vehicle 104 can include onboard location tracking services, for example, using a global positioning system (GPS). In some implementations, a vehicle 104 is autonomous or semi-autonomous vehicle, and includes onboard surveillance devices, e.g., LIDAR, onboard cameras, IR cameras, sensors, GPS, telemetry devices, and the like.

An onboard outward facing camera 110 can be, for example, a dashboard camera, or a camera mounted facing an outward position with respect to the vehicle 104. An onboard surveillance system 112 can collect surveillance data 111 from the onboard surveillance devices 110, for example, collecting video data using an image collection module 114. The video data from camera 110 includes the scene captured within a field of view 116 of the camera 110. The field of view 116 of camera 110 can include at least a portion of the home 106 when vehicle 104 is within a surrounding area of home 106, e.g., parked on the street in front of the house 106, parked in the driveway of the home 106, or the like.

In some implementations, vehicle 104 is a vehicle that is driving past or is temporarily stopped in the vicinity of the home 106. In one example, the vehicle 104 is temporarily stopped in front of home 106, where camera 110 of the vehicle 104 captures a portion of home 106 within a field of view 116 of the camera 110, e.g., a delivery truck, postal service truck, garbage/recycling truck, a bus that is at a bus stop, or the like. In another example, the vehicle 104 is driving along the street in front of the home 106, where a position of the vehicle 104 can be tracked using location tracking services, e.g., GPS location, and where camera 110 captures at least a portion of the home 106 within a field of view 116 of the camera 110 when the vehicle 104 drives past the home 106.

Home monitoring system 108 can include a set of surveillance devices 118 located in or surrounding the home 106, including, for example, cameras, motion detectors, window/door sensors, and keypad access door locks. The surveillance devices 118 may be installed indoors or outdoors, and can each have a field of view of a particular area of home 106. As depicted in the example environment 100 of FIG. 1, a surveillance device 118 is a camera (e.g., surveillance camera, night-vision camera, infrared camera, or the like) that captures video or still images of an area of the home 106 or is a motion detector that senses movement in a region of the home 106.

Home 106 can be, for example a residence (e.g., a single-family home, a town house, a condominium, or an apartment). In some implementations, a home 106 can be a commercial property (e.g., a business, government building, or a public space). In some implementations, the home monitoring system 108, the collaborative surveillance system 102, or a combination of the two systems can be hosted on one or more servers. Though described here as a home monitoring system 108 and a collaborative surveillance system 102, the functions described of each system can be implemented instead on more or fewer systems. In some implementations, the collaborative surveillance system 102 is a sub-system of the home monitoring system 108.

In some implementations, camera 110 and camera 118 may record the environment within respective fields of view 116 and 120 continuously and may detect objects of interest 122. In particular, an object of interest 122 can be a human, vehicle, or animal target. For example, an object of interest 122, as depicted in FIG. 1, is a human standing in front of the home 106.

In some implementations, camera 110 and camera 118 may record discontinuously and include one or more triggers (e.g., a movement trigger, sound trigger, and change in lighting trigger) for activating a recorded video and/or image. For example, a motion sensor may detect motion of an object of interest 122 within the respective fields of view 116, 120 of the cameras 110, 118, e.g., a human walking in a driveway of home 106, and trigger capturing the environment in an image or video clip. In another example, cameras 110, 118 may automatically capture scheduled bursts of video and/or images within the respective fields of view 116, 120 (e.g., every 10 seconds, every 60 seconds, every 5 minutes, or the like).

In some implementations, camera 110 is a camera on a vehicle that is driving past home 106, e.g., a bus, car, or delivery truck. The camera 110 can record discontinuously where the recording is triggered for activating a recorded video and/or image based in part on a determined location of the vehicle. For example, a GPS position of the vehicle can be used to determine that the vehicle is within the vicinity of home 106 and trigger recording of images and/or video by camera 110 for a duration while the vehicle is determined to be in the vicinity, e.g., within 100 feet, less than 500 feet, on the same block, etc., of the home 106.

Cameras 110, 118 can include object detection software to capture and detect potential objects of interest 122 in the respective fields of view 116, 120 of the cameras 110, 118. An image, e.g., a single frame or multiple frames, captured by the cameras 110 and 118 including an object of interest 122 can be processed by the object detection software and object of interest 122 may be classified as a class of object of interest, e.g., a "vehicle," a "human," an "animal," or the like.

In some implementations, one or more detection rules can be provided to the camera 110 and camera 118, e.g., a "trip wire rule," where the cameras 110, 118 collects image data when an object is determined to enter the respective fields of view 116, 120 of the cameras 110, 118. In some implementations, the object detection software is provided to the cameras 110, 118 when the camera is installed.

In some implementations, the object detection software includes a classifier to identify and classify object of interest 122 as a class of object. For example, a class of object of interest 122 can include human, animal, vehicle, vessels, bug, nature, or the like. For each class of object, the object detection software may include a database of physical properties of the class of object (e.g., size, speed, relative locations of features, etc.). In some implementations, a mapping between image and world coordinates may be used to create a database which stores average features of various objects (e.g., average human feature locations and size) to assist in object classification. For example, the object detection software may include a database of human targets, including average human target size (e.g., size of bounding box containing a human target) and relative location points for the head point and foot point. In another example, the object detection software includes a trained distributed neural network (DNN) that can detect and/or classify a number of different classes of objects.

A driver or passenger of vehicle 104 can access a user device 124, e.g., may own a mobile phone. User device 124 can be in data communication with the collaborative surveillance system 102 over a network, where a user of the user device 124 can provide a request 125 to the collaborative surveillance system 102 through an application environment 126 of an application on the user device 124. User device 124 may include a device that hosts and displays an application including an application environment 126. For example, a user device 124 is a mobile device that hosts one or more native applications that includes an application environment 126 (e.g., a graphical-user interface (GUI)) through which a user of the user device 124 may interact with the collaborative surveillance system 10. The user device 124 may be a cellular phone or a non-cellular locally networked device with a display. The user device 124 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 124 may perform functions unrelated to the collaborative surveillance system 102, such as placing personal telephone calls, playing music, playing video, displaying pictures, browsing the Internet, maintaining an electronic calendar, etc.

An application can be a software/firmware program running on the corresponding mobile device that enables the user interface and features described throughout, and is a system through which the collaborative surveillance system 102 may communicate with the user on user device 124. The user device 124 may load or install the application including the application environment 126 based on data received over a network or data received from local media. The application runs on mobile devices platforms, such as iPhone, iPod touch, Blackberry, Google Android, Windows Mobile, etc. The one or more user devices 124 may receive the data from the collaborative surveillance system 102 through the network, as described in more detail above. In one example, the user application environment 126 enables the user of user device 124, e.g., the driver of vehicle 104, to provide requests for parking spots to the collaborative surveillance system 102.

In some implementations, the application environment 126 is a part of a home monitoring application for the home monitoring system 108. For example, a user of user device 124 may receive alerts through the application environment 126 that are related to the collaborative surveillance system 102 and notifications from the home monitoring system 108 that are related to home monitoring (e.g., home security).

Referring to Stage A, a user of the user device 124 provides a request 125 for a parking spot to the collaborative surveillance system 102 through the application environment 126. Request 125 can include a destination, e.g., using data from a mapping application on the user device 124 and user preferences for the parking spot, e.g., a preferred radius for a parking spot location relative to the destination, a preferred maximum cost of the parking spot, and the like. For example, a request 125 can be for a parking spot located within a 2 block radius from the retail store destination and that is less than $2 per hour in cost-to-park.

In stage B, a co-monitoring system determiner 128 can receive, as input, the request 125 from the user device 124 and determine one or more available parking spots for the vehicle 104 associated with the user device 124. Co-monitoring system determiner 128 can access a database 130 of home monitoring system(s) 108 for respective home(s) 106 that have opted into a collaborative surveillance agreement. Database 130 can include geographic location of the home 106, real-time parking availability, surveillance monitoring capabilities of the home monitoring system 108, and the like. Continuing the example above, a particular home 106 can be determined to be within the request 2 block radius of a destination for the vehicle 104 where the cost of parking is less than $2 per hour.

In some implementations, the co-monitoring system determiner 128 can determine if surveillance capabilities of the vehicle 104 meet a threshold of surveillance capabilities required by the particular home monitoring system 108. The co-monitoring system 128 can access a database of vehicle identification data 132, including information related to the appearance of the vehicle, ownership, license plate, surveillance capabilities, and the like. For example, vehicle 104 can include a dashboard camera 110 and a LIDAR system that can be engaged in co-surveillance activities.

The co-monitoring system determiner 128 can then determine a particular parking spot or parking location for the vehicle 104, where the particular parking spot or parking location is affiliated with a particular home 106 and home monitoring system 108, e.g., the parking spot is on the street nearby the home 106, the parking spot is in a shared parking lot or driveway as the home 106, or the like. For example, the co-monitoring system determiner 128 can determine that there is an available spot for street parking in front of the property of home 106 where a home owner of home 106 has opted into a co-surveillance agreement.

In some implementations, a parking spot may be associated with multiple homes 106 each with respective home monitoring system 108. The multiple homes 106 may be adjacent and/or be part of a cul-de-sac where the parking spot may be near by two or more home 106 such that an onboard camera 110 of the vehicle 104 may be able to collect image data for multiple homes 106.

The co-monitoring system determiner 128 can provide, as output to the user device 124, directions 134 to a particular parking spot associated with a particular home monitoring system 108 of home 106. In some implementations, the directions 134 to the particular parking spot can be provided through the application environment 126, e.g., in a graphical user interface (GUI) including visual and textual information to assist the user of the user device 124 to identify the parking spot. In some implementations the directions 134 to the particular parking spot can be incorporated into a mapping application on the user device 124, where the mapping application can receive the parking spot location and or directions 134 and direct the user of the user device 124 to the particular parking spot.

In some implementations, directions 134 can include information about landmarks, e.g., image data including identified landmarks, that an onboard camera 110 of the vehicle 104 can locate in captured image data from the onboard camera to direct the vehicle 104 to a particular location of the parking spot. For example, an image of a light pole located at a corner of a home property can be compared to images captured in the field of view 116 of the onboard camera 110 to determine if the vehicle 104 is in the correct or approximately correct position of the parking spot.

The co-monitoring system determiner 128 can additionally provide, as output to the home monitoring system 108, vehicle identification data 136 for the vehicle 104. The vehicle identification data 136 provided to the home monitoring system 108 can be used by the home monitoring system 108 to identify the vehicle 104 as vehicle 104 is located within a detectable area of the surveillance devices 118 of the home monitoring system 108. In one example, a license plate number, year/make/model of the vehicle 104, color of the vehicle 104, or the like can be used to identify the vehicle. In another example, the co-monitoring system determiner 128 can provide to the vehicle 104 and/or to the home monitoring system 108 instructions including a particular pattern for flashing a light, e.g., a headlight for the vehicle 104, a front porch light for the home 106, or the like. The unique blink pattern can be used by the vehicle 104 and the home monitoring system 108 to positively identify each other visually by matching the provided unique blink pattern with an observed blink pattern.

In Stage C of FIG. 1, the home monitoring system 108 determines, based on surveillance data 138 from the surveillance devices 118 of the vehicle 104 that the vehicle 104 has arrived in the parking spot. Surveillance data 138 of the vehicle 104 can include video data, where the vehicle 104 is determined to appear within a field of view 120 of a camera 118, e.g., based on the detection of the vehicle using object detection software for the camera 118.

In some implementations, surveillance data 138 of the vehicle 104 can include a geofence established by the home monitoring system 108 surrounding the parking spot, where the vehicle 104 can be determined to be within the geofence. A geofence is a virtual geographic boundary, defined by GPS or radio-frequency identification (RFID) technology, that enables software, e.g., the home monitoring system, to trigger a response when a user device 124, vehicle 104, etc., enters or leaves a particular area Surveillance data 138 can include license plate readers, motion detectors, or other data generated by surveillance devices 118 belonging to the home monitoring system 108.

In Stage D of FIG. 1, the onboard surveillance system 112 for the vehicle 104 determines that the vehicle 104 has arrived at the parking spot. The onboard surveillance system 112 can utilize, for example, telemetry data, GPS data, image data collected by an onboard camera 110, or a combination thereof, to determine that the vehicle 104 has arrived at the parking spot.

In some implementations, a user of the user device 124 can provide a location update through the application environment 126 that the vehicle 104 has arrived at the parking spot. For example, a user can input "I've arrived" textually and/or verbally, through the application environment 126 that the vehicle 104 has arrived. In another example, a user can provide an indication, e.g., selecting a soft-key button, providing a verbal "yes/no," or the like, to the application environment to indicate that the vehicle 104 has arrived at the parking spot.

In Stage E, the home monitoring system 108 receives, as input from the surveillance devices 118, surveillance data 138 of the vehicle 104. The vehicle identification module 140 receives, as input, surveillance data 138 and vehicle identification data 132. The vehicle identification module 140 can process the surveillance data 138 and determine, based on the surveillance data 138 and vehicle identification data 132, that the vehicle 104 is parked in the designated parking spot and provide, as output, vehicle location information 142 to a detection rule generator 144.

One or more designated parking spots can be designated using a geospatial reference frame, e.g., on a map, as discrete spots and/or as parking zones. The geospatial reference frame can be established using the surveillance cameras of the home monitoring system 108, where the cameras are calibrated and geo-registered such that a location of the vehicle 104 in a respective field of view of each camera can be translated into the geospatial reference frame and compared against a designated parking space. The home monitoring system 108 can dynamically adjust the availability, location, designation, etc., of the parking spots and choose which parking space the vehicle 104 should utilize.

The designated parking spot can be chosen based in part on an available field of view of the onboard surveillance system of the vehicle 104 and a particular area of the home 106 that is to be monitored. For a particular designated parking spot, the co-monitoring system determiner 128 can guide the vehicle 104 to the spot, e.g., using a mapping application, and provide confirmation when the vehicle 104 is located in the proper parking spot or within a parking zone of the designated parking spot.

When the vehicle 104 arrives at the designated parking spot, the home monitoring system 108 can receive information detailing vehicle identification data 132 and the position of the vehicle, e.g., GPS coordinates and/or relative position to the home 106. As the vehicle 104 is parking in the designated parking spot, the home monitoring system 108 can detect the vehicle 104 and track the vehicle visually using one or more surveillance cameras of the home monitoring system 108. The home monitoring system 108 may use position data from sensors located on the vehicle 104 to assist in locating and positively identifying the vehicle 104.

After confirming that the vehicle 104 has arrived and is stopped, e.g., parked or temporarily stopped, in the parking spot, the home monitoring system 108 can compute an estimated final location and orientation of the vehicle 104 and the respective fields of view 116 of each camera 110 and/or other onboard surveillance devices.

In some implementations, the surveillance data 138 can include image data from each onboard camera 110 of the vehicle 104. The home monitoring system 108 can receive the image data and determine, using object detection software, objects that are included in the scene, for example, one or more home 106, landmarks (e.g., light poles, street signs, etc.), other vehicles 104. The system 108 can use the identified objects to determine if a particular home 106 of interest is present in the scene. The system 108 can use identified landmark objects in the scene of the image data from the onboard camera 110 to verify a particular location of the vehicle 104 relative to the home 106.

The detection rule generator 144 can receive, as input, the vehicle location information 142 and data 146 from the onboard surveillance system 112. In some implementations, data 146 can include image and/or video data from the onboard camera 110 including a field of view 116 of the onboard camera 110, e.g., an image captured by the onboard camera 110 showing the scene captured by the onboard camera 110. Based on the field of view 116 of the onboard camera 110 and vehicle location information 142, the detection rule generator 144 can determine an area of the home 106 that is within the field of view 116 of the onboard camera.

Responsive to the determined location of the vehicle 104 with respect to home 106, the detection rule generator 144 can generate, as output, detection rule(s) 148 for the onboard surveillance system 112. Detection rule(s) 148 can be utilized by the onboard surveillance system 112 to collect and provide surveillance data, e.g., video data, to the home monitoring system 108.

In some implementations, detection rule(s) 148 can include calibration and/or operating instructions for the onboard camera 110, based in part on what calibration and/or operating parameters are available for the particular onboard camera 110 (e.g., range of motion, imaging modes, sensitivity adjustments, etc.). Calibration instructions can include a physical orientation of the camera (e.g., tilt, angle, etc.), for example, a specific orientation to position the camera 110 such that the camera 110 is imaging a particular portion of home 106. Operating instructions can be to operate the camera in night or IR mode, to adjust a level of sensitivity or triggering to movement, and the like.

In some implementations, different detection rule(s) 148 can be provided to each onboard surveillance device of the onboard surveillance system 112. The different detection rule(s) 148 can reflect a different field of view for each of the onboard surveillance devices, e.g., different onboard cameras can be looking at different portions of the home 106. In another example, the different detection rule(s) 148 can reflect a different type of onboard surveillance device, e.g., a first set of detection rule(s) 148 can be for an onboard camera, and a second, different set of detection rules 148 can be for a LIDAR system. Further details about detection rule(s) 148 are described below with reference to FIG. 2A.

In some implementations, the onboard surveillance system 112 collects initial surveillance data including imaging data from each onboard camera 110 when the vehicle 104 is determined to arrive at the parking spot. The initial surveillance data can be used as a basis of comparison when an event is detected to compare differences in an event scene and a non-event scene.

Figure 2A:
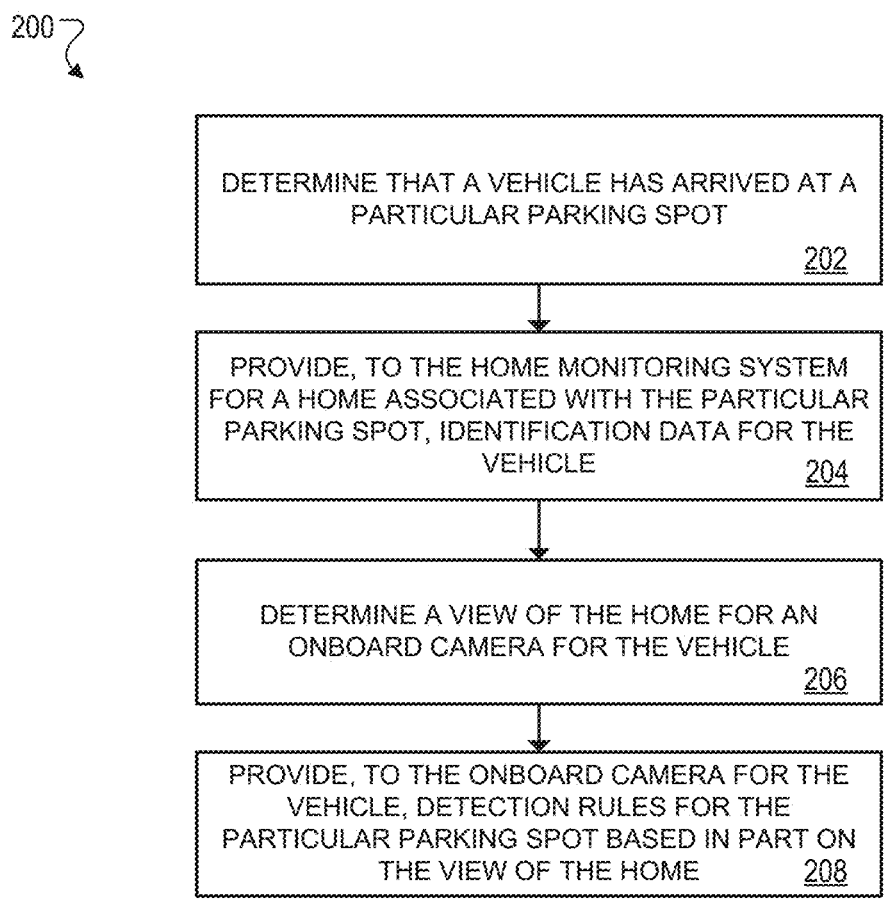
FIG. 2A is a flow diagram of an example process of the collaborative surveillance system.

FIG. 2A is a flow diagram of an example process 200 of the collaborative surveillance system. As described above with reference to Stage E in FIG. 1, a vehicle is determined to arrive at a particular parking spot (202). Data (e.g., data 146) from an onboard surveillance system 112 on the vehicle (e.g., vehicle 104) including, for example, GPS data, telemetry data, or the like, can be provided to the home monitoring system 108. In some implementations, image data from an onboard camera 110 on the vehicle can be provided to the home monitoring system 108. A scene depicted in the image data can be used to determine that the vehicle has arrived at the particular parking spot, e.g., a scene including the exterior of the home, house numbers, or other identifying features of the home 106.

Identification data for the vehicle is provided to the home monitoring system for a home associated with the particular parking spot (204). Identification data 136, e.g., license plate information, year/make/model, image(s) of the vehicle, can be provided to the home monitoring system 108 to assist in identifying that the vehicle 104 has arrived at the parking spot. For example, the collaborative surveillance system 102 can provide identification data 136 including a description of the vehicle, e.g., "Red Honda Accord Sedan" and a license plate number "123QWERTY" to the home monitoring system 108. The home monitoring system 108 can use image data from surveillance devices 118 and image recognition software to determine if the vehicle 104 that has arrived at the parking spot matches the description of the vehicle.

A view of the home is determined for an onboard camera for the vehicle (206). Once the vehicle is determined to be in position in the parking spot, image data from the onboard surveillance system 112, e.g., images captured by an onboard camera 110, can be provided to the home monitoring system 108. The view of the home for the onboard camera 110 includes at least a portion of the home 106 that is captured within the field of view 116 of the onboard camera 110. For example, the field of view 116 of the camera can include a portion of the driveway of the home 106 and a front entrance for the home 106. In another example, the field of view 116 of the onboard camera 110 can include a fence gate on a side of the home 106 and a part of a first story of the home 106.

Detection rules for the particular parking spot are provided to the onboard camera for the vehicle based in part on the view of the home for the onboard camera (208). Detection rules 148 can be to set the triggering of data 146 collection by the onboard surveillance system 112 to be initiated by the onboard surveillance system 112, e.g., that the onboard surveillance system 112 detects an event occurring, and/or to set the triggering of data collection by the onboard surveillance system 112 to be initiated by the home monitoring system 108, e.g., that the home monitoring system 108 detects that an event is occurring.

The detection rules 148 for the particular parking spot can depend in part on the view of the home that the onboard camera is determined to have within the field of view of the camera. In some implementations, detection rules 148 can include instructions to trigger the onboard camera 110 to collect and provide data 148, e.g., detection images, to the home monitoring system 108 when the onboard surveillance system 112 determines a detection event, for example, an object in the field of view of the camera 110. Detection of an event can be triggered by activation of a motion sensor, trip-wire, or the like of the onboard surveillance system 112.

Continuing the example above, for a field of view 116 including a portion of the driveway of the home and the front entrance for the home 106, detection rules 148 can be to collect and provide data 146, e.g., detection images to the home monitoring system 108 when an object is determined to be located within the field of view 116 of the camera. Further details related to onboard surveillance system 112 triggered image collection is described with reference to FIG. 3A.

In some implementations, detection rules 148 can include instructions to trigger the onboard camera 110 to collect and provide data 146, e.g., detection images, to the home monitoring system 108 when the home monitoring system 108 determines a detection event, for example, an object in the field of view of a surveillance device 118, activation of a home security alarm, a ringing of a doorbell, activation of a garage door, or the like. In the example presented above, for a field of view 116 including a portion of the driveway of the home and the front entrance for the home 106, detection rules 148 can be to collect and provide images to the home monitoring system 108 when the home monitoring system 108 sends a control signal to the onboard surveillance system 112 to begin collecting and providing detection images. Further details related to home monitoring system 108 triggered image collection is described with reference to FIG. 3B.

As described briefly above, in some implementations, detection rules 148 can include instructions to trigger the onboard camera 110 to collect and provide data 148, e.g., detection images, to the home monitoring system 108 when the onboard surveillance system 112 determines a detection event.

Figure 2B:
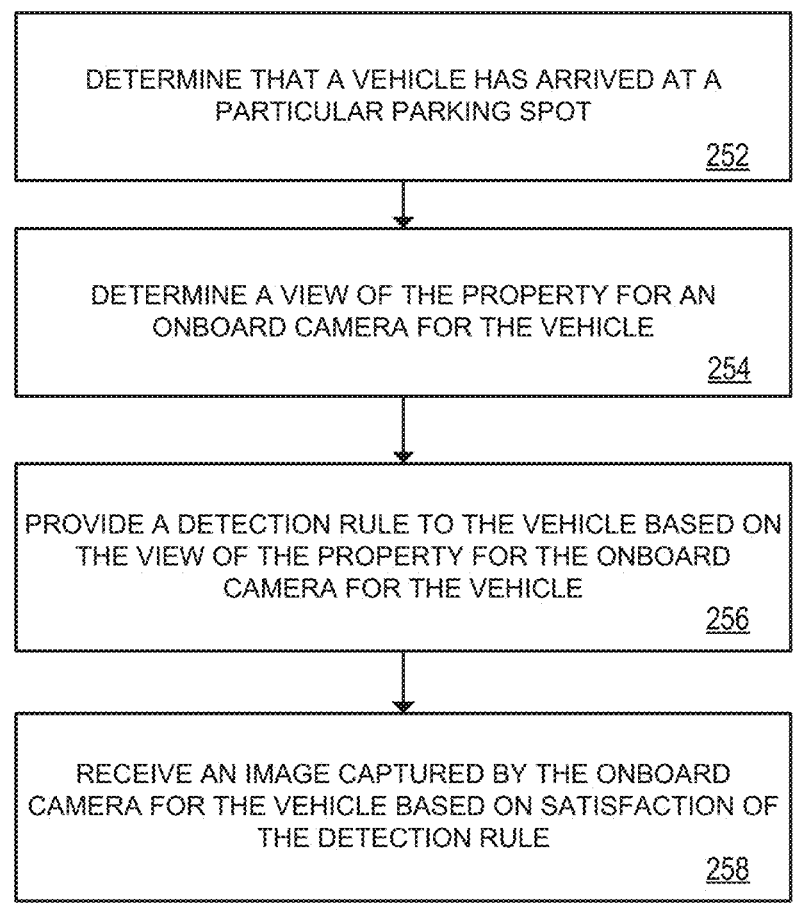
FIG. 2B is a flow diagram of another example process of the collaborative surveillance system.

FIG. 2B is a flow diagram of another example process 250 of the collaborative surveillance system. The process 250 includes determining a vehicle has arrived at a particular parking spot (252). For example, the collaborative surveillance system 102 may determine that the vehicle 104 has arrived at a particular parking spot.

In some implementations, determining that a vehicle has arrived at a particular parking spot includes determining a geographical position of the vehicle based on a global positioning system in the vehicle and determining that the geographical position matches the particular parking spot. For example, the collaborative surveillance system 102 may receive GPS coordinates from the user device 124 that is being used by a user within the vehicle 104 and determine that the GPS coordinates stored for the parking spot and the GPS coordinates received are within 0.003 latitude and 0.003 longitude of one another so the geographical position of the vehicle 104 matches the particular parking spot.

The process 250 includes determining a view of a property for an onboard camera for the vehicle (254). For example, the collaborative surveillance system 102 may determine that the onboard camera 110 is viewing the front of the home 106. In some implementations, determining a view of a property for an onboard camera for the vehicle includes determining the view of the property for the onboard camera for the vehicle based on an image of the vehicle captured by a camera of the property. For example, the collaborative surveillance system 102 may receive an image captured by the camera 118 of the home 106, perform object recognition on the image to determine a position and orientation of the camera 110 and/or vehicle 104, and then determine that the onboard camera 110 is viewing the front of the home 106 based on the position and orientation determined from the image.

In some implementations, determining a view of a property for an onboard camera for the vehicle includes determining the view of the property for the onboard camera for the vehicle based on an image of the property captured by the onboard camera for the vehicle.

For example, the collaborative surveillance system 102 may receive an image captured by the onboard camera 110, and from the image determine that the onboard camera 110 is viewing the front of the home 106.

In some implementations, determining the view of the property for the onboard camera for the vehicle based on an image captured by the onboard camera for the vehicle includes receiving the image of the property captured by the onboard camera for the vehicle and recognizing a portion of the property in the image of the property. For example, the collaborative surveillance system 102 may receive an image captured by the onboard camera 110, perform object recognition on the camera to recognize a front door of the home 106, and then determine that the onboard camera 110 is viewing the front of the home 106 based on recognizing the front door of the home 106.

The process 250 includes providing a detection rule to the vehicle based on the view of the property for the onboard camera for the vehicle (256). For example, the collaborative surveillance system 102 may provide a detection rule that states any time a human is seen in a particular region of pixels in the view of the onboard camera, then the vehicle 104 is to provide a notification and an image of the human in the particular region to the collaborative surveillance system 102.

In some implementations, providing a detection rule to the vehicle based on the view of the property for the onboard camera for the vehicle includes generating the detection rule based on a location of a portion of the property in a view of the onboard camera. For example, the collaborative surveillance system 102 determine where a driveway of the home 106 is in a view from the onboard camera 110 based on the view of the onboard camera 110, and then generate a detection rule that specifies any time a human is detected in the area of the view where the driveway is determined then the vehicle 104 is to notify the collaborative surveillance system 102

The process 250 includes receiving an image captured by the onboard camera for the vehicle based on satisfaction of the detection rule (258). For example, the collaborative surveillance system 102 may receive an image of a human on the driveway captured by the onboard camera 110.

In some implementations, the process 250 includes receiving a request for a parking spot in which to park the vehicle and selecting the particular parking spot from among multiple parking spots based on surveillance capabilities of the vehicle. For example, the collaborative surveillance system 102 may receive a request from the user device 124 for a nearby parking spot or a parking spot near a particular location, and the collaborative surveillance system 102 may then select the particular parking spot from among twenty different parking spots based on that the vehicle 104 has an onboard camera 110. In another example, the collaborative surveillance system 102 may receive a request from another user device for a nearby parking spot or a parking spot near a particular location, and the collaborative surveillance system 102 may then select another parking spot from among twenty different parking spots based on that a vehicle associated with the user device does not have any onboard cameras.

In some implementations, selecting the particular parking spot from among multiple parking spots based on surveillance capabilities of the vehicle includes receiving identification data for the vehicle and determining surveillance capabilities of the vehicle based on the identification data. For example, the collaborative surveillance system 102 may receive an identification of a user account that is requesting the parking spot, then identify a make, model, and year of a vehicle associated with the user account, and then determine surveillance capabilities of vehicles of that make, model, and year.

In some implementations, the process 250 includes guiding the vehicle to the particular parking spot that was selected. For example, the collaborative surveillance system 102 may provide turn by turn instructions to the particular parking spot to the user device 124. In some implementations, the process 250 includes determining a detection event based on data provided by sensors within the property, providing the vehicle a request for a second image captured by the onboard camera for the vehicle based on the detection event that was determined, and receiving the second image captured by the onboard camera in response to the request for the second image. For example, the collaborative surveillance system 102 may determine that motion was detected near a driveway based on an image from surveillance device 108, then provide the vehicle 104 a request for images, and then receive images captured by the onboard camera 110 in response to the request.

While the process 250 is described generally in the examples as being performed by the collaborative surveillance system 102, the process 250 may similarly be performed by the home monitoring system 108 or the surveillance device 118. For example, the home monitoring system 108 may determine that the vehicle 104 has arrived at a particular parking spot and provide a detection rule to the vehicle 104.

Figure 3A:
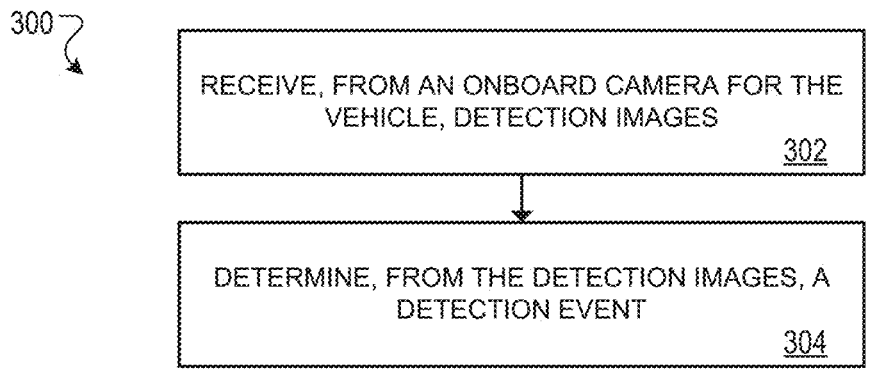
FIG. 3A is a flow diagram of another example process of the collaborative surveillance system.

FIG. 3A is a flow diagram of another example process 300 of the collaborative surveillance system 102. In some implementations, detection images are received from the onboard camera for the vehicle (302) by the home monitoring system. Detection images can include one or more identified objects, e.g., humans, vehicles, animals, or the like, that are identified by object detection software for the onboard camera 110. Detection images can include meta-data, e.g., time/date, location, weather conditions, trajectory of motion of the identified object, or the like.

A detection event is determined based on the detection images (304). The home monitoring system 108 can receive the detection images from the onboard surveillance system 112 and determine that a detection event is occurring. A detection event is an occurrence of an event of interest, e.g., the presence of a vehicle, human, animal, etc., in a vicinity of home 106. A detection event can be determined when an object of interest is detected in an image collected from a surveillance device 118 or onboard camera 110. A detection event can be determined when a trip-wire or motion sensor is activated in the home monitoring system 108.

In some implementations, the home monitoring system 108 can generate one or more alerts based on the detection event and provide, for example, a notification to a homeowner about the detection event. For example, a detection event can be an unknown vehicle parked in the driveway of the home 106 that is identified in detection image(s) provided by the onboard camera 110 of the vehicle 104. The home monitoring system 108 can provide a notification to the homeowner of home 106 to alert the homeowner of the unknown vehicle in the driveway, including the detection image(s).

In some implementations, the home monitoring system 108 can combine a detection event with data from other surveillance devices/sensors to provide more details about the detection event and/or trigger more complex rules. For example, surveillance cameras of home 106 and camera 110 on the vehicle 104 can capture the same person from different angles or at different points in the path taken by the person around the home 106.

Figure 3B:
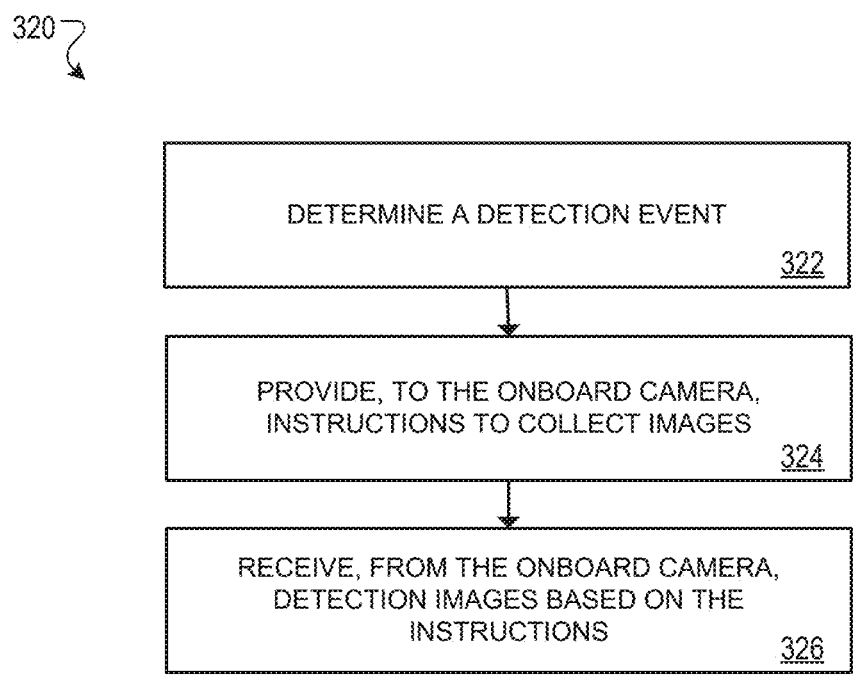
FIG. 3B is a flow diagram of another example process of the collaborative surveillance system.

FIG. 3B is a flow diagram of another example process 320 of the collaborative surveillance system. A detection event is determined (322) by a home monitoring system 108. The detection event can be determined based on objects of interest, e.g., humans, vehicles, animals, etc., detected in images data collected by the surveillance system 118. In some implementations, the detection event can be determined based on one or more triggers being activated in the home monitoring system 108, e.g., doorbell ringing, tripwire, doors opening, garage door opener, gate unlocking, etc.

Instructions are provided to the onboard camera 110 to collect data 146 by the home monitoring system 108 (324). The home monitoring system 108 can provide instructions to the onboard surveillance system 112 to collect and provide data 146, e.g., video data from onboard camera 110, to the home monitoring system 108. In one example, the home monitoring system 108 determines that a front doorbell has been activated and provides instructions to the onboard surveillance system 112 for vehicle 104 to collect and provide image data from the onboard camera 110 to the home monitoring system 108, where the onboard camera 110 is determined to include the front door of the home 106 in the field of view 116 of the camera 110.

In some implementations, an onboard camera for the vehicle is in an idle or standby operating mode until the instructions provided by the home monitoring system wake up the onboard camera to collect images. For example, the onboard surveillance system for the vehicle may operate in a low-alert or standby mode until receiving instructions to collect data for the home monitoring system.

In some implementations, the collaborative surveillance system 102 can determine one or more vehicles 104 are in the vicinity of a home 106 after the home monitoring system 108 detects an event at the home 106. The home monitoring system 108 can determine an occurrence of an event, e.g., a doorbell ring, and subsequently send a request for additional collaborative surveillance from vehicles that are parked nearby the home 106. The collaborative surveillance system 102 can initiate a search for nearby vehicles 104 that are participating in the collaborative surveillance agreement and have appropriate surveillance capabilities. Once one or more vehicles 104 have been identified, the home monitoring system 108 can provide instructions to the respective onboard cameras 110 of the identified vehicles as described above in step 324 of FIG. 3B.

The home monitoring system receives, from the onboard camera, detection images based on the instructions provided by the home monitoring system (326).

In some implementations, detection rules to the onboard camera can include a period of time that the onboard camera should collect detection images and provide the detection images to the home monitoring system after the onboard camera detects an event and/or receives instructions from the home monitoring system to collect images. For example, a detection rule can be that the onboard camera should collect and provide detection images to the home monitoring system for a period of five minutes, 10 minutes, or 30 seconds.

In some implementations, detection rules to the onboard camera can include instructions to collect and provide detection images for as long as the onboard camera image recognition software determines that an object is moving within a field of view of the onboard camera. For example, the onboard camera can collect and provide detection images as long as the camera detects that a person is walking in the driveway of the home.

In some implementations, the home monitoring system can identify a particular object of interest, e.g., a person or vehicle, and provide detection rules including information about the particular object of interest to the onboard camera. The onboard camera can receive detection rules that instruct the onboard camera to collect and provide detection images to the home monitoring system when the particular object of interest is within a field of view of the onboard camera.

In some implementations, a vehicle 104 can be an electric vehicle or have access to a large electric power source (e.g., for a commercial vehicle). Detection rule(s) 148 can be determined for the electric vehicle to leverage the availability of a larger than normal power supply, e.g., to run continuous or semi-continuous analytics of the video data rather than only capturing and analyzing video data when an event is detected.

Collaborative surveillance between the vehicle 104 and the home 106 can be established for a set amount of time based on, for example, the needs of the home 106, an amount of time that the vehicle 104 is parked at the parking spot, or for a set amount of time dictated by a user of the user device 124 or a homeowner of home 106. For example, a user of the user device 124 (e.g., driver or passenger of vehicle 104) can set thresholds for battery life or available power for the onboard surveillance system 112, where the system 112 will disconnect when a battery life is below the threshold. In another example, the collaborative surveillance can be terminated when the vehicle 104 is determined to be moving out of the parking spot, e.g., using GPS data. A user of user device 124 can manually terminate the collaborative surveillance, e.g., through the application environment.

In some implementations, privacy measures can be implemented to anonymize the multiple parties, e.g., home/homeowner, driver/vehicle, etc., involved in the collaborative surveillance. For example, detection images collected by the onboard surveillance system 112 for the vehicle 104 can be redacted to ensure privacy before being reviewed by a home owner of the home 106. Detection images that may include partial views of inside the vehicle, e.g., from a dashboard camera, may be partially redacted such that the partial views of the inside of the vehicle are obscured before the detection images are provided to a homeowner of the home. In another example, meta-data associated with detection images from the onboard surveillance system for the vehicle may be removed before the detection images are provided to a home owner of a home 106.

In some implementations, the collaborative surveillance system 102 provides limited details to the user of the user device 124 regarding the home 106 associated home monitoring system 108. For example, a parking spot can be selected between two homes or across the street from the home 106, to obscure which home 106 is subject to the collaborative surveillance agreement.

In some implementations, drivers and passengers of the vehicle 104 may be redacted as they are determined to be leaving and returning to vehicle 104, as long as the drivers and passengers are not determined to be within a vicinity of the property or violate other rules of the home monitoring system, e.g., approach a mailbox for the home 106, walk onto the driveway of home 106, etc. Redacting the drivers and passengers can include blurring or pixelating facial features or entire bodies of the drivers/passengers.

The vehicle 104 may be redacted from images captured by the home monitoring system 108 when the vehicle 104 is determined to not be in violation of a set of rules of the home monitoring system, e.g., not parked in the driveway, not committing a crime against home 106, etc.

Figure 4:
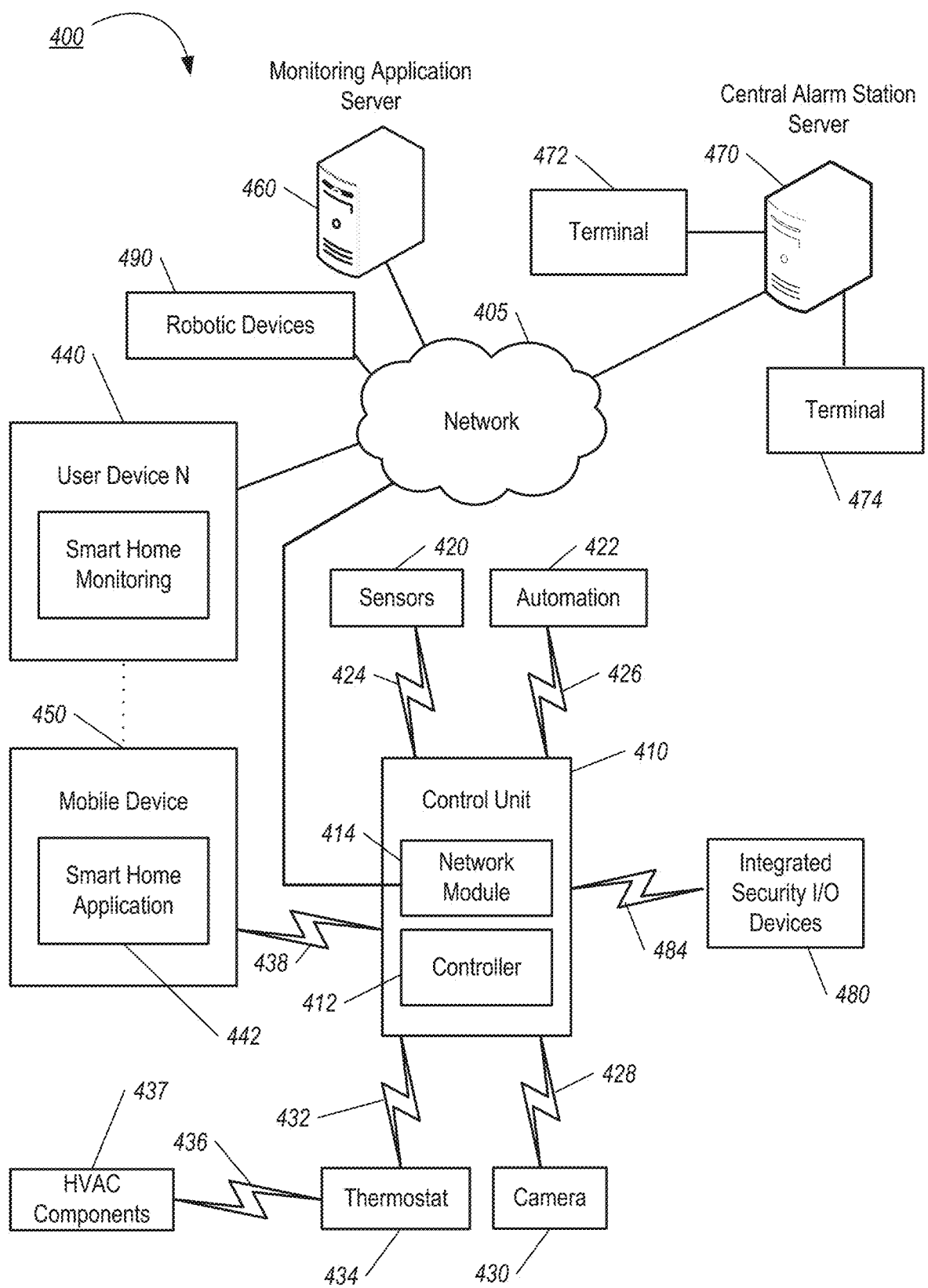
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home monitoring application 442. The smart home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 442 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
generating, by one or more servers, a plurality of detection rules that are associated with a plurality of views of a property capturing different portions of the property, wherein the plurality of detection rules correspond to different portions of the property;
receiving, by the one or more servers, imaging data captured by an onboard camera for a vehicle;
determining, by the one or more servers and from the imaging data captured by the onboard camera for the vehicle, a portion of the property that is captured in the imaging data by the onboard camera for the vehicle;
selecting, by the one or more servers and based on the portion of the property that was determined to be captured in the imaging data by the onboard camera for the vehicle, a particular detection rule from the plurality of detection rules to provide to the onboard camera for the vehicle comprising:
    determining, from the imaging data captured by the onboard camera for the vehicle, that the portion of the property captured by the onboard camera includes a front door of the property; and
    selecting, based on determining that the captured imaging data includes the front door of the property, the particular detection rule comprising instructions to detect for humans in a region around the front door of the property;
providing, by the one or more servers and to the onboard camera, the particular detection rule of the plurality of detection rules, wherein the particular detection rule corresponds to the portion of the property including the front door captured in the imaging data by the onboard camera for the vehicle; and
receiving, by the one or more servers and from the onboard camera, an image captured by the onboard camera for the vehicle based on satisfaction of the particular detection rule, wherein the satisfaction of the particular detection rule comprises detecting, by the onboard camera, a human around the front door of the property.

2. The method of claim 1, wherein determining the portion of the property captured in the imaging data by the onboard camera for the vehicle comprises:
determining the portion of the property captured in the imaging data by the onboard camera for the vehicle based on an image of the vehicle captured by a camera of the property.

3. The method of claim 1, wherein determining the portion of the property captured in the imaging data by the onboard camera for the vehicle comprises:
receiving the image of the property captured by the onboard camera for the vehicle; and
recognizing the portion of the property in the image of the property.

4. The method of claim 1, wherein providing a detection rule to the vehicle based on the portion of the property captured in the imaging data by the onboard camera for the vehicle comprises:
generating the detection rule based on a location of a portion of the property in a view of the onboard camera.

5. The method of claim 1, wherein determining that a vehicle has arrived at a particular parking spot comprises:
determining a geographical position of the vehicle based on a global positioning system in the vehicle; and
determining that the geographical position matches the particular parking spot.

6. The method of claim 1, comprising:
receiving a request for a parking spot in which to park the vehicle; and
selecting a particular parking spot from among multiple parking spots based on surveillance capabilities of the vehicle.

7. The method of claim 6, wherein selecting the particular parking spot from among multiple parking spots based on surveillance capabilities of the vehicle comprises:
receiving identification data for the vehicle; and
determining surveillance capabilities of the vehicle based on the identification data.

8. The method of claim 6, comprising:
guiding the vehicle to the particular parking spot that was selected.

9. The method of claim 1, comprising:
determining a detection event based on data provided by sensors within the property;
providing the vehicle a request for a second image captured by the onboard camera for the vehicle based on the detection event that was determined; and
receiving the second image captured by the onboard camera in response to the request for the second image.

10. A system comprising:
one or more computers and one or more storage devices storing instructions that are operable, when executed by the one or more computers, to cause the one or more computers to perform operations comprising:
generating a plurality of detection rules that are associated with a plurality of views of a property capturing different portions of the property, wherein the plurality of detection rules correspond to different portions of the property;
receiving imaging data captured by an onboard camera for a vehicle;
determining, from the imaging data captured by the onboard camera for the vehicle, a portion of the property that is captured in the imaging data by the onboard camera for the vehicle;
selecting, based on the portion of the property that was determined to be captured in the imaging data by the onboard camera for the vehicle, a particular detection rule from the plurality of detection rules to provide to the onboard camera for the vehicle comprising:
    determining, from the imaging data captured by the onboard camera for the vehicle, that the portion of the property captured by the onboard camera includes a front door of the property; and
    selecting, based on determining that the captured imaging data includes the front door of the property, the particular detection rule comprising instructions to detect for humans in a region around the front door of the property;
providing, to the onboard camera, the particular detection rule of the plurality of detection rules, wherein the particular detection rule corresponds to the portion of the property including the front door captured in the imaging data by the onboard camera for the vehicle; and receiving, from the onboard camera, an image captured by the onboard camera for the vehicle based on satisfaction of the particular detection rule, wherein the satisfaction of the particular detection rule comprises detecting, by the onboard camera, a human around the front door of the property.

11. The system of claim 10, wherein determining the portion of the property captured in the imaging data by the onboard camera for the vehicle comprises:
  determining the portion of the property captured in the imaging data by the onboard camera for the vehicle based on an image of the vehicle captured by a camera of the property.

12. The system of claim 10, wherein determining the portion of the property captured in the imaging data by the onboard camera for the vehicle comprises:
  receiving the image of the property captured by the onboard camera for the vehicle; and
  recognizing the portion of the property in the image of the property.

13. The system of claim 10, wherein providing a detection rule to the vehicle based on the portion of the property captured in the imaging data by the onboard camera for the vehicle comprises:
  generating the detection rule based on a location of the portion of the property in a view of the onboard camera.

14. The system of claim 10, wherein determining that a vehicle has arrived at a particular parking spot comprises:
  determining a geographical position of the vehicle based on a global positioning system in the vehicle; and
  determining that the geographical position matches the particular parking spot.

15. The system of claim 10, the operations comprising:
  receiving a request for a parking spot in which to park the vehicle; and
  selecting a particular parking spot from among multiple parking spots based on surveillance capabilities of the vehicle.

16. The system of claim 15, wherein selecting the particular parking spot from among multiple parking spots based on surveillance capabilities of the vehicle comprises:
  receiving identification data for the vehicle; and
  determining surveillance capabilities of the vehicle based on the identification data.

17. The system of claim 15, the operations comprising:
  guiding the vehicle to the particular parking spot that was selected.

18. A non-transitory computer-readable medium storing software comprising instructions executable by one or more computers which, upon such execution, cause the one or more computers to perform operations comprising:
  generating a plurality of detection rules that are associated with a plurality of views of a property capturing different portions of the property, wherein the plurality of detection rules correspond to different portions of the property;
  receiving imaging data captured by an onboard camera for a vehicle;
  determining, from the imaging data captured by the onboard camera for the vehicle, a portion of the property that is captured in the imaging data by the onboard camera for the vehicle;
  selecting, based on the portion of the property that was determined to be captured in the imaging data by the onboard camera for the vehicle, a particular detection rule from the plurality of detection rules to provide to the onboard camera for the vehicle comprising:
    determining, from the imaging data captured by the onboard camera for the vehicle, that the portion of the property captured by the onboard camera includes a front door of the property; and
    selecting, based on determining that the captured imaging data includes the front door of the property, the particular detection rule comprising instructions to detect for humans in a region around the front door of the property;
  providing, to the onboard camera, the particular detection rule of the plurality of detection rules, wherein the particular detection rule corresponds to the portion of the property including the front door captured in the imaging data by the onboard camera for the vehicle; and
  receiving, from the onboard camera, an image captured by the onboard camera for the vehicle based on satisfaction of the particular detection rule, wherein the satisfaction of the particular detection rule comprises detecting, by the onboard camera, a human around the front door of the property.

19. The method of claim 1, wherein the plurality of detection rules comprise a first set of detection rules for a first type of onboard camera and a second, different set of detection rules for a second, different type of onboard camera.

20. The method of claim 1, wherein the plurality of detection rules comprise operating instructions to adjust a level of sensitivity or triggering to movement for the onboard camera.

21. The method of claim 8, further comprising determining the vehicle is located at the particular parking spot, wherein the determining comprises:
  receiving, from the vehicle, identification data for the vehicle;
  receiving, image data from one or more surveillance devices of the property capturing the particular parking spot; and
  determining, from the image data and using the identification data, that the vehicle is located at the particular parking spot.

22. A computer-implemented method comprising:
  generating, by one or more servers, a plurality of detection rules that are associated with a plurality of views of a property capturing different portions of the property, wherein the plurality of detection rules correspond to different portions of the property;
  receiving, by the one or more servers, imaging data captured by an onboard camera for a vehicle;
  determining, by the one or more servers and from the imaging data captured by the onboard camera for the vehicle, a portion of the property that is captured in the imaging data by the onboard camera for the vehicle;
  selecting, by the one or more servers and based on the portion of the property that was determined to be captured in the imaging data by the onboard camera for the vehicle, a particular detection rule from the plurality of detection rules to provide to the onboard camera for the vehicle, wherein the particular detection rule comprises instructions to trigger the onboard camera to collect and provide detection images including an object detected in the portion of the property;

providing, by the one or more servers and to the onboard camera, the particular detection rule of the plurality of detection rules, wherein the particular detection rule corresponds to the portion of the property captured in the imaging data by the onboard camera for the vehicle; and receiving, by the one or more servers and from the onboard camera, an image captured by the onboard camera for the vehicle based on satisfaction of the particular detection rule, wherein the satisfaction of the particular detection rule comprises detecting, by the onboard camera, the object in the portion of the property, wherein the plurality of detection rules comprise calibration parameters for onboard cameras, and wherein selecting the particular detection rule from the plurality of detection rules for the onboard camera further comprises:

receiving, by the one or more servers and for the onboard camera, operating parameters for the onboard camera; and selecting, by the one or more servers and from the plurality of detection rules and based on the operating parameters for the onboard camera, the particular detection rule including at least one of tilt and angle positions for the onboard camera.

23. The method of claim 1, wherein determining the portion of the property that is captured in the imaging data by the onboard camera for the vehicle comprises:

receiving an image of the property captured by the onboard camera;

determining, based on one or more objects appearing within the captured image, the portion of the property captured in the imaging data.

24. The method of claim 1, wherein providing the particular detection rule further comprises:

providing, to the onboard camera, instructions to trigger the onboard camera to collect and provide detection images including the human detected within a particular region of pixels in the imaging data captured by the onboard camera of the portion of the property.

25. The method of claim 10, wherein the portion of the property captured in imaging data is a driveway.

26. The method of claim 22, wherein determining the portion of the property captured in the imaging data by the onboard camera for the vehicle comprises:

determining the portion of the property captured in the imaging data by the onboard camera for the vehicle based on an image of the vehicle captured by a camera of the property.

27. The method of claim 22, wherein determining the portion of the property captured in the imaging data by the onboard camera for the vehicle comprises:

receiving the image of the property captured by the onboard camera for the vehicle; and recognizing the portion of the property in the image of the property.

28. The method of claim 22, wherein providing a detection rule to the vehicle based on the portion of the property captured in the imaging data by the onboard camera for the vehicle comprises:

generating the detection rule based on a location of a portion of the property in a view of the onboard camera.

29. The method of claim 22, wherein determining that a vehicle has arrived at a particular parking spot comprises:

determining a geographical position of the vehicle based on a global positioning system in the vehicle; and determining that the geographical position matches the particular parking spot.

30. The method of claim 22, comprising:

receiving a request for a parking spot in which to park the vehicle; and selecting a particular parking spot from among multiple parking spots based on surveillance capabilities of the vehicle.

31. The method of claim 30, wherein selecting the particular parking spot from among multiple parking spots based on surveillance capabilities of the vehicle comprises:

receiving identification data for the vehicle; and determining surveillance capabilities of the vehicle based on the identification data.

32. The method of claim 30, comprising:

guiding the vehicle to the particular parking spot that was selected.

33. The method of claim 32, comprising determining the vehicle is located at the particular parking spot, wherein the determining comprises:

receiving, from the vehicle, identification data for the vehicle;

receiving, image data from one or more surveillance devices of the property capturing the particular parking spot; and determining, from the image data and using the identification data, that the vehicle is located at the particular parking spot.

34. The method of claim 22, comprising:

determining a detection event based on data provided by sensors within the property;

providing the vehicle a request for a second image captured by the onboard camera for the vehicle based on the detection event that was determined; and receiving the second image captured by the onboard camera in response to the request for the second image.

35. The method of claim 22, wherein the plurality of detection rules comprise a first set of detection rules for a first type of onboard camera and a second, different set of detection rules for a second, different type of onboard camera.

36. The method of claim 22, wherein the plurality of detection rules further comprise operating instructions to adjust a level of sensitivity or triggering to movement for the onboard camera.

37. A system comprising:

one or more computers and one or more storage devices storing instructions that are operable, when executed by the one or more computers, to cause the one or more computers to perform operations comprising:

generating a plurality of detection rules that are associated with a plurality of views of a property capturing different portions of the property, wherein the plurality of detection rules correspond to different portions of the property;

receiving imaging data captured by an onboard camera for a vehicle;

determining, by the one or more servers and from the imaging data captured by the onboard camera for the vehicle, a portion of the property that is captured in the imaging data by the onboard camera for the vehicle;

selecting, based on the portion of the property that was determined to be captured in the imaging data by the onboard camera for the vehicle, a particular detection rule from the plurality of detection rules to provide to the onboard camera for the vehicle, wherein the particular detection rule comprises instructions to trigger the onboard camera to collect and provide detection images including an object detected in the portion of the property;
providing, to the onboard camera, the particular detection rule of the plurality of detection rules, wherein the particular detection rule corresponds to the portion of the property captured in the imaging data by the onboard camera for the vehicle; and
receiving, from the onboard camera, an image captured by the onboard camera for the vehicle based on satisfaction of the particular detection rule, wherein the satisfaction of the particular detection rule comprises detecting, by the onboard camera, the object in the portion of the property,
wherein the plurality of detection rules comprise calibration parameters for onboard cameras, and wherein selecting the particular detection rule from the plurality of detection rules for the onboard camera further comprises:
receiving, for the onboard camera, operating parameters for the onboard camera; and
selecting, from the plurality of detection rules and based on the operating parameters for the onboard camera, the particular detection rule including at least one of tilt and angle positions for the onboard camera.

38. The system of claim 37, wherein the portion of the property captured in imaging data is a driveway.

39. The system of claim 37, wherein determining the portion of the property captured in the imaging data by the onboard camera for the vehicle comprises:
determining the portion of the property captured in the imaging data by the onboard camera for the vehicle based on an image of the vehicle captured by a camera of the property.

40. The system of claim 37, wherein determining the portion of the property captured in the imaging data by the onboard camera for the vehicle comprises:
receiving the image of the property captured by the onboard camera for the vehicle; and
recognizing the portion of the property in the image of the property.

41. The system of claim 37, wherein providing a detection rule to the vehicle based on the portion of the property captured in the imaging data by the onboard camera for the vehicle comprises:
generating the detection rule based on a location of a portion of the property in a view of the onboard camera.

42. The system of claim 37, wherein determining that a vehicle has arrived at a particular parking spot comprises:
determining a geographical position of the vehicle based on a global positioning system in the vehicle; and
determining that the geographical position matches the particular parking spot.

43. The system of claim 37, comprising:
receiving a request for a parking spot in which to park the vehicle; and
selecting a particular parking spot from among multiple parking spots based on surveillance capabilities of the vehicle.

44. The system of claim 43, wherein selecting the particular parking spot from among multiple parking spots based on surveillance capabilities of the vehicle comprises:
receiving identification data for the vehicle; and
determining surveillance capabilities of the vehicle based on the identification data.

45. The system of claim 43, comprising:
guiding the vehicle to the particular parking spot that was selected.

46. The system of claim 45, comprising determining the vehicle is located at the particular parking spot, wherein the determining comprises:
receiving, from the vehicle, identification data for the vehicle;
receiving, image data from one or more surveillance devices of the property capturing the particular parking spot; and
determining, from the image data and using the identification data, that the vehicle is located at the particular parking spot.

47. The system of claim 37, comprising:
determining a detection event based on data provided by sensors within the property;
providing the vehicle a request for a second image captured by the onboard camera for the vehicle based on the detection event that was determined; and
receiving the second image captured by the onboard camera in response to the request for the second image.

48. The system of claim 37, wherein the plurality of detection rules comprise a first set of detection rules for a first type of onboard camera and a second, different set of detection rules for a second, different type of onboard camera.

49. The system of claim 37, wherein the plurality of detection rules further comprise operating instructions to adjust a level of sensitivity or triggering to movement for the onboard camera.

50. A non-transitory computer-readable medium storing software comprising instructions executable by one or more computers which, upon such execution, cause the one or more computers to perform operations comprising:
generating a plurality of detection rules that are associated with a plurality of views of a property capturing different portions of the property, wherein the plurality of detection rules correspond to different portions of the property;
receiving imaging data captured by an onboard camera for a vehicle;
determining, by the one or more servers and from the imaging data captured by the onboard camera for the vehicle, a portion of the property that is captured in the imaging data by the onboard camera for the vehicle;
selecting, based on the portion of the property that was determined to be captured in the imaging data by the onboard camera for the vehicle, a particular detection rule from the plurality of detection rules to provide to the onboard camera for the vehicle, wherein the particular detection rule comprises instructions to trigger the onboard camera to collect and provide detection images including an object detected in the portion of the property;
providing, to the onboard camera, the particular detection rule of the plurality of detection rules, wherein the particular detection rule corresponds to the portion of the property captured in the imaging data by the onboard camera for the vehicle; and
receiving, from the onboard camera, an image captured by the onboard camera for the vehicle based on satisfaction of the particular detection rule, wherein the satisfaction of the particular detection rule comprises detecting, by the onboard camera, the object in the portion of the property, wherein the plurality of detection rules comprise calibration parameters for onboard cameras, and wherein selecting the particular detection rule from the plurality of detection rules for the onboard camera further comprises:
  receiving, for the onboard camera, operating parameters for the onboard camera; and
  selecting, from the plurality of detection rules and based on the operating parameters for the onboard camera, the particular detection rule including at least one of tilt and angle positions for the onboard camera.

51. The computer-readable medium of claim 50, wherein the portion of the property captured in imaging data is a driveway.

52. The computer-readable medium of claim 50, wherein determining the portion of the property captured in the imaging data by the onboard camera for the vehicle comprises:
  determining the portion of the property captured in the imaging data by the onboard camera for the vehicle based on an image of the vehicle captured by a camera of the property.

53. The computer-readable medium of claim 50, wherein determining the portion of the property captured in the imaging data by the onboard camera for the vehicle comprises:
  receiving the image of the property captured by the onboard camera for the vehicle; and
  recognizing the portion of the property in the image of the property.

54. The computer-readable medium of claim 50, wherein providing a detection rule to the vehicle based on the portion of the property captured in the imaging data by the onboard camera for the vehicle comprises:
  generating the detection rule based on a location of a portion of the property in a view of the onboard camera.

55. The computer-readable medium of claim 50, wherein determining that a vehicle has arrived at a particular parking spot comprises:
  determining a geographical position of the vehicle based on a global positioning system in the vehicle; and
  determining that the geographical position matches the particular parking spot.

56. The computer-readable medium of claim 50, comprising:
  receiving a request for a parking spot in which to park the vehicle; and
  selecting a particular parking spot from among multiple parking spots based on surveillance capabilities of the vehicle.

57. The computer-readable medium of claim 56, wherein selecting the particular parking spot from among multiple parking spots based on surveillance capabilities of the vehicle comprises:
  receiving identification data for the vehicle; and
  determining surveillance capabilities of the vehicle based on the identification data.

58. The computer-readable medium of claim 56, comprising:
  guiding the vehicle to the particular parking spot that was selected.

59. The computer-readable medium of claim 58, comprising determining the vehicle is located at the particular parking spot, wherein the determining comprises:
  receiving, from the vehicle, identification data for the vehicle;
  receiving, image data from one or more surveillance devices of the property capturing the particular parking spot; and
  determining, from the image data and using the identification data, that the vehicle is located at the particular parking spot.

60. The computer-readable medium of claim 50, comprising:
  determining a detection event based on data provided by sensors within the property;
  providing the vehicle a request for a second image captured by the onboard camera for the vehicle based on the detection event that was determined; and
  receiving the second image captured by the onboard camera in response to the request for the second image.

61. The computer-readable medium of claim 50, wherein the plurality of detection rules comprise a first set of detection rules for a first type of onboard camera and a second, different set of detection rules for a second, different type of onboard camera.

62. The computer-readable medium of claim 50, wherein the plurality of detection rules further comprise operating instructions to adjust a level of sensitivity or triggering to movement for the onboard camera.

* * * * *

UNITED STATES PATENT AND TRADEMARK OFFICE
CERTIFICATE OF CORRECTION

PATENT NO. : 11,200,435 B1
APPLICATION NO. : 16/815769
DATED : December 14, 2021
INVENTOR(S) : Scanlon et al.

Page 1 of 1

It is certified that error appears in the above-identified patent and that said Letters Patent is hereby corrected as shown below:

In the Claims

In Claim 25, Column 31, Line 42, delete "claim 10," and insert -- claim 22, --.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*